United States Patent
Li et al.

(10) Patent No.: US 12,536,739 B2
(45) Date of Patent: Jan. 27, 2026

(54) METHOD AND APPARATUS FOR VIRTUAL AVATAR GENERATION

(71) Applicant: Hong Kong Applied Science and Technology Research Institute Company Limited, Hong Kong (HK)

(72) Inventors: Zhuoxuan Li, Hong Kong (HK); Jingyi Xu, Hong Kong (HK); Yi Li, Hong Kong (HK); Hon Wah Wong, Hong Kong (HK); Yanchen Wang, Hong Kong (HK); Man Choi Chan, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 308 days.

(21) Appl. No.: 18/450,428

(22) Filed: Aug. 16, 2023

(65) Prior Publication Data
US 2025/0061649 A1 Feb. 20, 2025

(51) Int. Cl.
*G06T 17/00* (2006.01)
*G06F 3/04855* (2022.01)
(Continued)

(52) U.S. Cl.
CPC .......... *G06T 17/00* (2013.01); *G06F 3/04855* (2013.01); *G06T 5/50* (2013.01);
(Continued)

(58) Field of Classification Search
None
See application file for complete search history.

(56) References Cited

U.S. PATENT DOCUMENTS 9,245,369 B2    1/2016  Joo et al.
9,613,450 B2 *  4/2017  Wang .................... G10L 21/10
(Continued)

FOREIGN PATENT DOCUMENTS

CN    105976809 B    12/2019
CN    115690238 A    2/2023

OTHER PUBLICATIONS

Shiohara et al., BlendFace: Re-designing Identity Encoders for Face-Swapping, 2023 (Year: 2023).*
(Continued)

*Primary Examiner* — Phong X Nguyen
(74) *Attorney, Agent, or Firm* — Idea Intellectual Limited; Sam T. Yip

(57) ABSTRACT

An apparatus for virtual avatar generation is provided, including a face encoder, a face fusion engine, a voice encoder, and a voice fusion engine. The face encoder extracts first facial features from the first facial image and then encodes they into M first facial feature vectors and extracts second facial features from the second facial image and then encodes they into M second facial feature vectors. The face fusion engine generates a facial fused feature vector from the facial feature vectors, thereby generating a fused image. The voice encoder extracts first voice features from the first audio clip and then encodes they into N first voice feature vectors and extracts second voice features from the second audio clip and then encodes they into N second voice feature vectors. The voice fusion engine synthesizes a voice fused feature vector from the voice feature vectors, thereby generating a fused voice.

14 Claims, 8 Drawing Sheets

(51) Int. Cl.
*G06T 5/50* (2006.01)
*G06T 13/40* (2011.01)
*G06V 40/16* (2022.01)
*G10L 15/02* (2006.01)

(52) U.S. Cl.
CPC ............ *G06T 13/40* (2013.01); *G06V 40/171* (2022.01); *G10L 15/02* (2013.01); *G06T 2207/10004* (2013.01); *G06T 2207/20221* (2013.01); *G06T 2207/30201* (2013.01)

(56) References Cited

U.S. PATENT DOCUMENTS

| | | | | |
|---|---|---|---|---|
| 9,824,502 | B2* | 11/2017 | Tong | G06F 3/011 |
| 11,113,859 | B1* | 9/2021 | Xiao | G06T 15/005 |
| 11,138,781 | B1* | 10/2021 | Linton | G06N 3/08 |
| 11,217,036 | B1* | 1/2022 | Albuz | G06T 19/20 |
| 11,218,666 | B1* | 1/2022 | Haas | G06V 40/28 |
| 11,289,067 | B2 | 3/2022 | Brimijoin et al. | |
| 11,373,352 | B1* | 6/2022 | Gafni | G06T 11/60 |
| 11,455,765 | B2 | 9/2022 | Long et al. | |
| 11,574,392 | B2* | 2/2023 | Lin | G06F 18/24 |
| 11,847,804 | B1* | 12/2023 | Ivanov | G06V 40/70 |
| 11,854,203 | B1* | 12/2023 | Gafni | G06T 7/70 |
| 2012/0113106 | A1 | 5/2012 | Choi et al. | |
| 2017/0069124 | A1 | 3/2017 | Tong et al. | |
| 2018/0253593 | A1* | 9/2018 | Hu | G06V 40/165 |
| 2018/0336716 | A1 | 11/2018 | Ramprashad et al. | |
| 2020/0160595 | A1* | 5/2020 | Lv | G06T 7/40 |
| 2020/0166991 | A1 | 5/2020 | Aggarwal et al. | |
| 2020/0327726 | A1* | 10/2020 | Lin | G06V 10/774 |
| 2021/0312685 | A1* | 10/2021 | Guo | G06T 17/20 |
| 2022/0028149 | A1 | 1/2022 | Prasad et al. | |
| 2022/0351348 | A1* | 11/2022 | Chae | G06T 13/205 |
| 2022/0399025 | A1* | 12/2022 | Chae | G06N 3/0455 |
| 2023/0072759 | A1* | 3/2023 | Zhang | G06N 3/09 |
| 2023/0100427 | A1* | 3/2023 | He | G06V 10/755 |
| | | | | 382/118 |
| 2023/0223006 | A1* | 7/2023 | Fan | H04M 1/72403 |
| | | | | 704/231 |
| 2023/0267587 | A1* | 8/2023 | Ng | H04N 1/3876 |
| | | | | 382/100 |
| 2023/0401682 | A1* | 12/2023 | Hu | G06V 10/774 |
| 2023/0410447 | A1* | 12/2023 | Cheng | G06V 40/171 |
| 2024/0078731 | A1* | 3/2024 | Beith | G06T 13/205 |
| 2024/0185381 | A1* | 6/2024 | Malek | G06T 5/50 |
| 2025/0061649 | A1* | 2/2025 | Li | G06T 17/00 |

OTHER PUBLICATIONS

International Search Report and Written Opinion of corresponding PCT application No. PCT/CN2023/120448 mailed on Mar. 20, 2024.

* cited by examiner

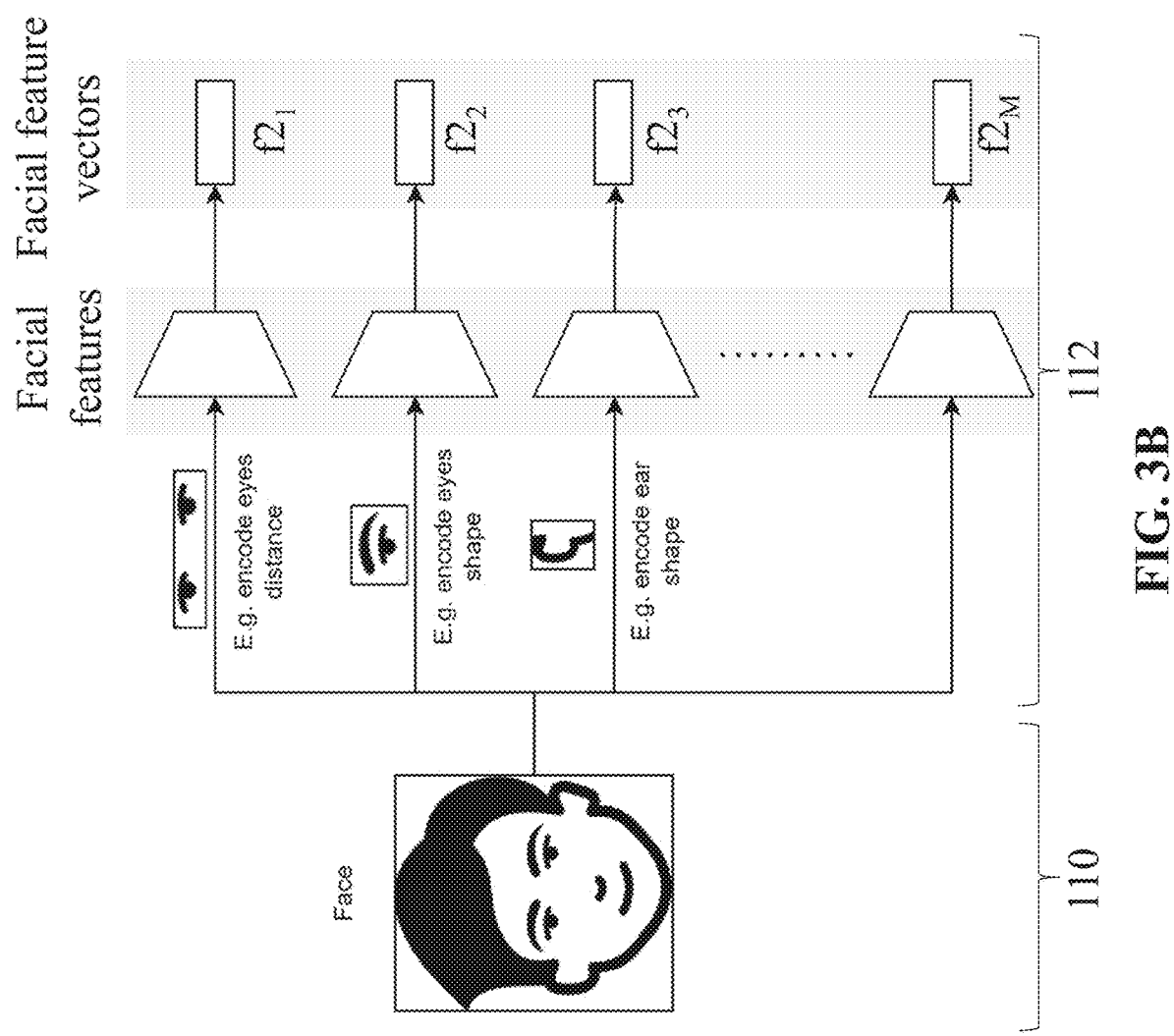

METHOD AND APPARATUS FOR VIRTUAL AVATAR GENERATION

TECHNICAL FIELD

The present invention relates to method and apparatus for virtual avatar generation by using a fusion engine to combine two face or voice sources.

BACKGROUND

With the rapid growth of use of human-like avatars in the media in recent years, there has been a significant demand for cost-effective content generation solutions with virtual characters. This market spans various fields, including video livestreaming, broadcasting, gaming, and social media, where avatars are utilized to enhance engagement and personalization. As technology advances, the demand for more realistic and interactive avatars continues to grow, driving innovation in avatar creation and attracting attention to techniques of creating unique and diverse avatars, offering users a fresh and customized experience.

However, conventional methods of creating human-like avatars often involve high costs and require specialized knowledge to handle complex three-dimensional (3D) graphics processing software. Moreover, generation of just human face for avatar is no longer enough for the current market. The current virtual avatar generation focus only on the generation of the face and facial expression, but largely neglect the generation of the voice or the matching of the face the voice. Further still, there are legal issues when using real human faces and/or voices for avatar creation.

Therefore, there is a need in the market for a way to generate avatars with artificial faces and voices.

SUMMARY OF INVENTION

It is an objective of the present invention to provide an apparatus and a method to address the aforementioned shortcomings and unmet needs in the state of the art. In accordance with a first aspect of the present invention, an apparatus for virtual avatar generation is provided. The apparatus includes a face recorder, a face encoder, a face fusion engine, a voice recorder, a voice encoder, and a voice fusion engine. The face recorder is configured to receive and store a first facial image and a second facial image. The face encoder is configured to: identify faces of the first facial image and the second facial image; extract a plurality of first facial features from the first facial image and then encode them into M first facial feature vectors; and extract a plurality of second facial features from the second facial image and then encode them into M second facial feature vectors. The face fusion engine is configured to synthesize a facial fused feature vector from the first facial feature vectors in combination with the second facial feature vectors, thereby generating a fused image from the facial fused feature vector. The voice recorder is configured to receive and store a first audio clip and a second audio clip. The voice encoder is configured to: identify voices of the first audio clip and the second audio clip; extract a plurality of first voice features from the first audio clip and then encode them into N first voice feature vectors; and extract a plurality of second voice features from the second audio clip and then encode them into N second voice feature vectors. The voice fusion engine is configured to synthesize a voice fused feature vector from the first voice feature vectors in combination with the second voice feature vectors, thereby generating a fused voice from the voice fused feature vector.

In accordance with a second aspect of the present invention, a method for virtual avatar generation is provided. The method comprises the steps: receiving and storing a first facial image and a second facial image by a face recorder; identifying faces of the first facial image and the second facial image by a face encoder; extracting a plurality of first facial features from the first facial image and then encode them into M first facial feature vectors by the face encoder; extracting a plurality of second facial features from the second facial image and then encode them into M second facial feature vectors by the face encoder; generating a facial fused feature vector from the first facial feature vectors in combination with the second facial feature vectors by a face fusion engine, thereby generating a fused image from the facial fused feature vector; receiving and storing a first audio clip and a second audio clip by a voice recorder; identifying voices of the first audio clip and the second audio clip by a voice encoder; extracting a plurality of first voice features from the first audio clip and then encode them into N first voice feature vectors by the voice encoder; and extracting a plurality of second voice features from the second audio clip and then encode them into N second voice feature vectors by the voice encoder; and generating a voice fused feature vector from the first voice feature vectors in combination with the second voice feature by a voice fusion engine, thereby generating a fused voice from the voice fused feature vector.

By the embodiments of the present invention, the virtual avatar generation can be achieved through feature extraction and fusion from different face or voice sources, offering both a manual controlling mode and an automatic setting mode for users. The virtual avatar generation of the present invention can enable the creation of non-existent virtual avatars and voices for complying with legal regulations, which allows for personalized and customizable virtual experiences.

BRIEF DESCRIPTION OF DRAWINGS

Embodiments of the invention are described in more details hereinafter with reference to the drawings, in which:

FIGS. 3A and 3B depict the schematic diagrams of the face fusion process steps as illustrated in FIG. 2;

DETAILED DESCRIPTION OF THE INVENTION

In the following description, apparatuses and methods for virtual avatar generation and the likes are set forth as preferred examples. It will be apparent to those skilled in the art that modifications, including additions and/or substitutions may be made without departing from the scope and spirit of the invention. Specific details may be omitted so as not to obscure the invention, however, the disclosure is written to enable one skilled in the art to practice the teachings herein without undue experimentation.

Figure 1:
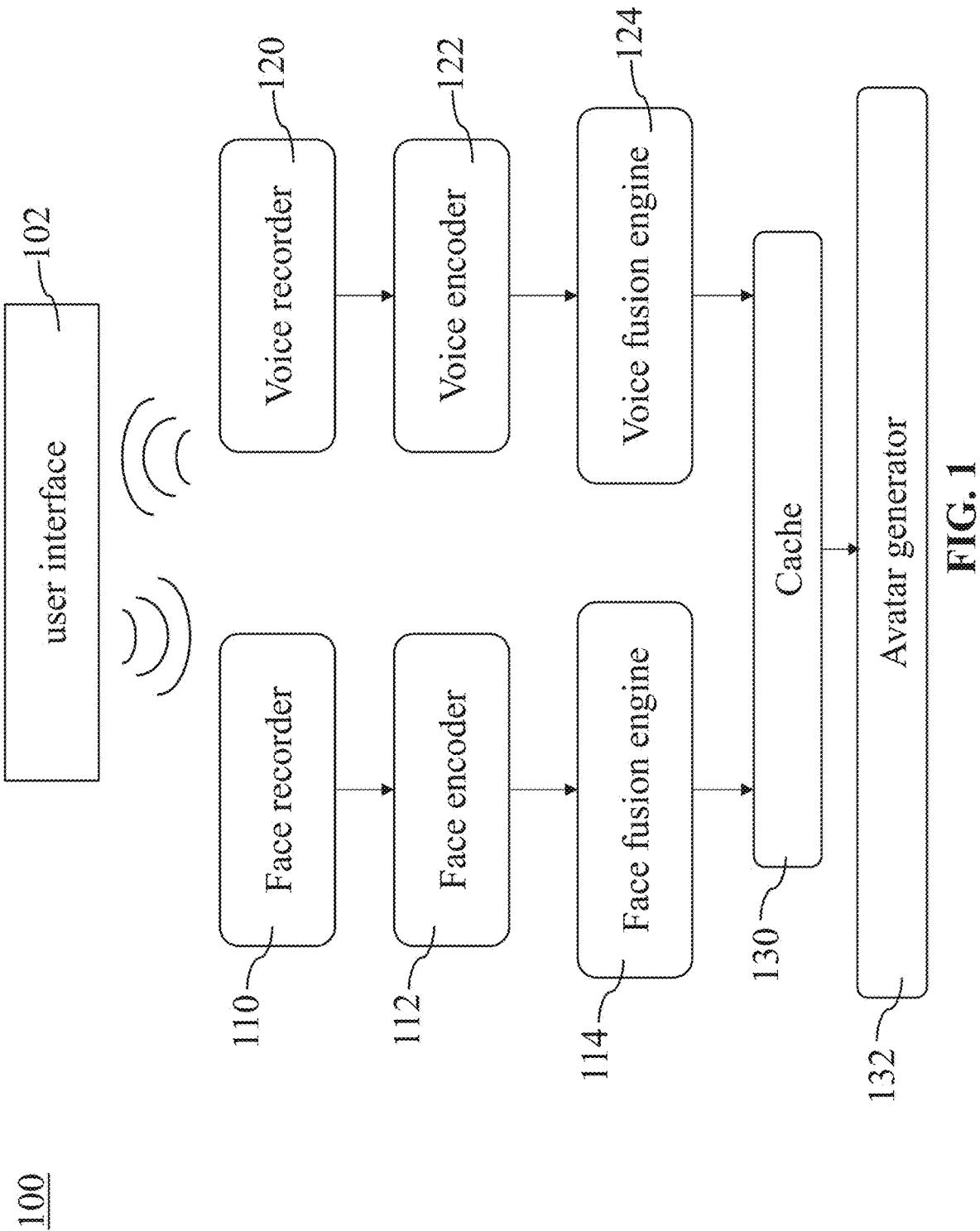
FIG. 1 depicts a schematic diagram of an apparatus for virtual avatar generation in accordance with various embodiments of the present invention.

Referring to FIG. 1 for the following description. The apparatus 100 for virtual avatar generation includes a user interface 102, a face recorder 110, a face encoder 112, a face fusion engine 114, a voice recorder 120, a voice encoder 122, a voice fusion engine 124, a cache 130, and an avatar generator 132.

The user interface 102 facilitates electrical communication with other components through wired or wireless connections, enabling interactive capabilities. For instance, users of the apparatus 100 can remotely operate the virtual avatar generation process through the user interface 102. The user can upload at least two or more faces and voices to the face recorder 110 and the voice recorder 120, respectively, via the user interface 102, using the form of face images and audio clips.

In an embodiment, two or more face images uploaded to the face recorder 110 are further processed by the face encoder 112 and the face fusion engine 114 for face fusion; and two or more audio clips uploaded to the voice recorder 120 are further processed by the voice encoder 122 and the voice fusion engine 124 for voice fusion. The obtained fusion face and voice then can be fed into the avatar generator 132 for virtual avatar generation as purposed. The details regarding the fusion and the virtual avatar generation are provided as follows.

Figure 3A:
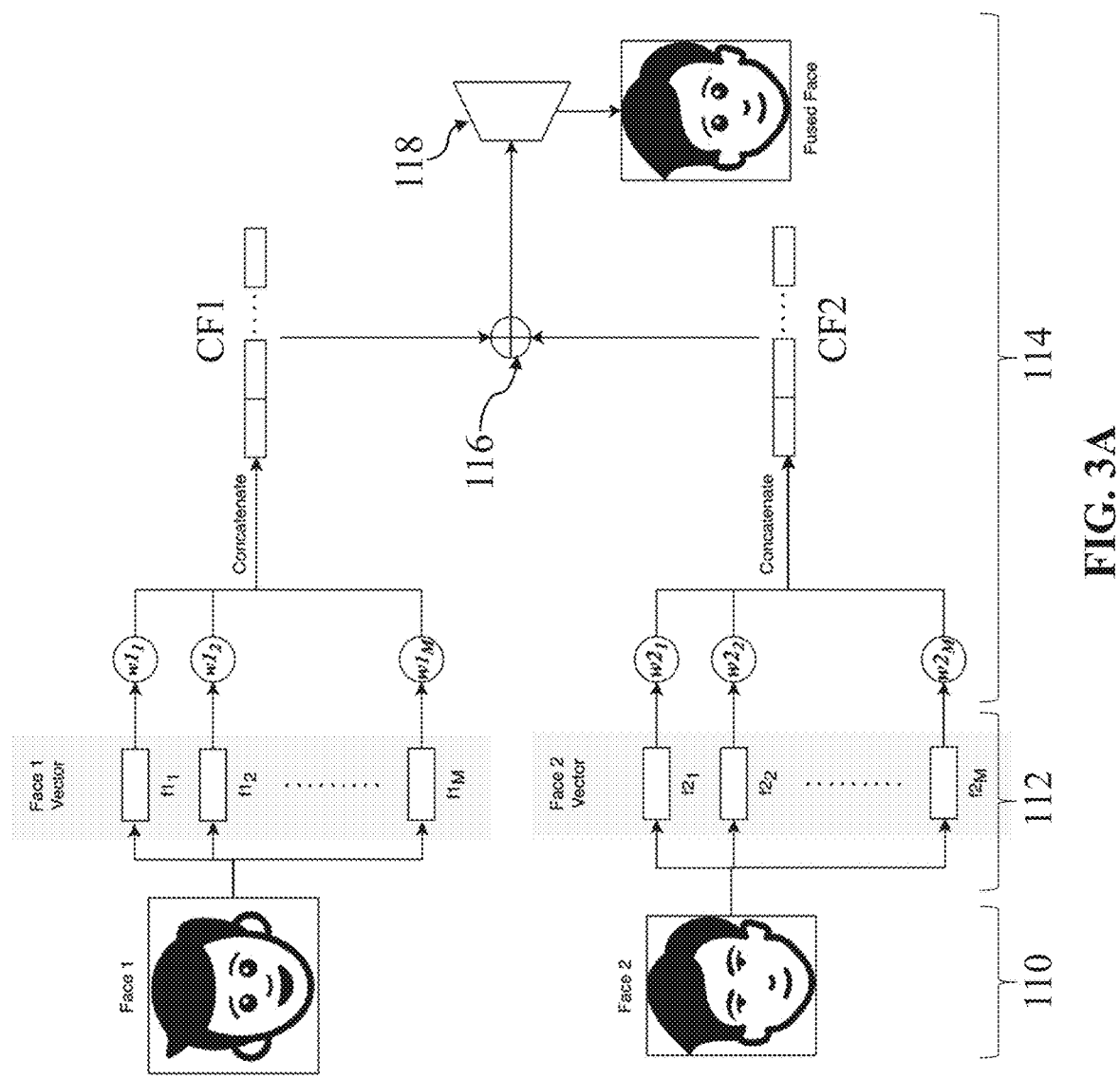
Figure 2:
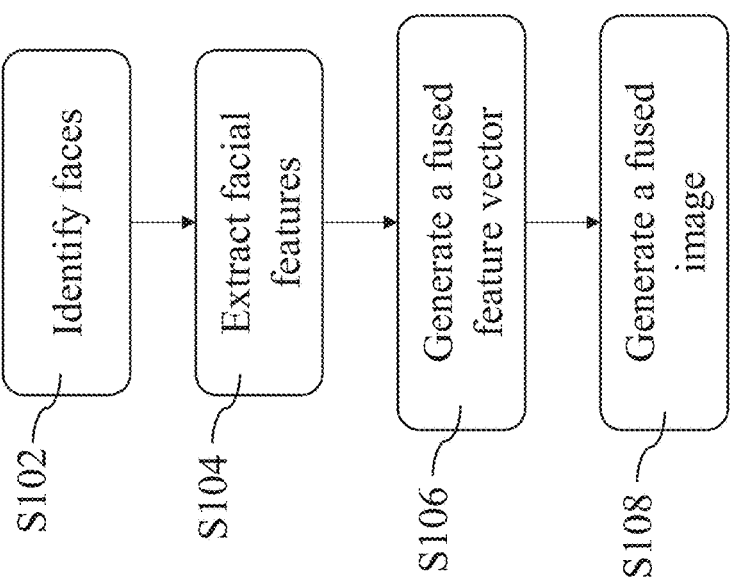
FIG. 2 depicts a schematic flowchart for face fusion in accordance with an embodiment of the present invention.

Referring to FIGS. 2, 3A, and 3B for the following description. In one embodiment, the face fusion includes steps S102, S104, S106, and S108.

In the step S102, the face recorder 110 can receive a first facial image and a second facial image from the user interface 102 and store them, in which the first facial image and the second facial image are two discernible differences images. The face encoder 112 accesses the face recorder 110 to read the facial images and identify the faces in the first and second facial images.

The face encoder 112 is trained to encode the facial features to vectors. A corresponding face decoder (including in face fusion engine) can decode the facial feature vectors encoded by the face encoder 112 as a face image. A dataset containing facial images and their corresponding identities is prepared. A suitable pretrained face segmentation model is chosen to segment the facial images inside the dataset. With facial images, its segmentation result and identities as inputs, after training, the face encoder 112 learns to identify and encode the facial images. The model's performance is evaluated, and adjustments can be made if necessary. In various embodiments, the labeled identities include various facial features such as eye (i.e., shape, size, position, color), eye brow (i.e., size, shape, position, color), skin (i.e., color, wrinkle, freckle), beard (i.e., style, color), nose (i.e., shape, size, position), mouth/lips (i.e., size, shape, color, position), ear (i.e., size, shape, position), hair (i.e., color, style), and face shape, as exemplary shown in FIG. 3B. In one embodiment, an StyleGAN2-based encoder is chosen for face encoder 112.

In the step S104, the face encoder 112 extracts facial features from the facial images. Specifically, the face encoder 112 extracts a plurality of first facial features, as exemplarily listed above, from the first facial image, and then encodes the extracted first facial features into M first facial feature vectors $f1_1$, $f1_2$, $f1_M$ (i.e., each first facial feature vector represents one feature of the face from the first facial image) The face encoder 112 further extracts a plurality of second facial features, as exemplarily listed above, from the second facial image, and then encodes the extracted second facial features into M second facial feature vectors $f2_1$, $f2_2$, $f2_M$ (i.e., each second facial feature vector represents one feature of the face from the second facial image). This encoding process involves representing the extracted facial features as numerical representations in the form of feature vectors. By encoding the extracted facial features into feature vectors, the face encoder 112 transforms the qualitative facial information into quantitative representations. These quantitative representations are suitable for further processing, such as face fusion.

In step S106, the face fusion engine 114 synthesizes a facial fused feature vector by combining the first facial feature vectors with the second facial feature vectors. Specifically, the face fusion engine 114 assigns weights, $w1_1$, $w1_2$, $w1_M$, to the first facial feature vectors $f1_1$, $f1_2$, $f1_M$, respectively, and weights $w2_1$, $w2_2$, $w2_M$, to the second facial feature vectors $f2_1$, $f2_2$, $f2_M$, respectively. The first facial feature vectors with their respective weights are concatenated to form a first single vector CF1, and the second facial feature vectors with their respective weights are concatenated to form a second single vector CF2. The face fusion engine 114 also includes a combiner 116 that receives the first and second single vectors CF1 and CF2, fuses them together to generate the facial fused feature vector.

During the fusion, the M first facial feature vectors are paired one-to-one with the M second facial feature vectors, and each pair may have a different weight set. In various embodiments, the different pairs are permitted to have different weight sets. For example, a vector representing the distance between the eyes in the first facial image, with a weight A1, is paired with another vector representing the distance between the eyes in the second facial image, with a weight B1. Similarly, a vector representing the shape of the eyes in the first facial image, with a weight C1, is paired with another vector representing the shape of the eyes in the second facial image, with a weight D1. It should be noted that, in an embodiment, A1+B1=1, C1+D1=1, and A1≠C1 and B1≠D1. In one embodiment, the assigned weights are obtained from a first weight distribution. This means that the generation of the facial fused feature vector depends on the specific weight distribution used. The determination of the first weight distribution is discussed in the later description.

The face fusion engine 114 further includes a face decoder 118 that receives the facial fused feature vector to generate a fused face image based on the facial fused feature vector in the step S108. The decoding process involves using the well-trained face decoder 118 to transform the facial fused feature into one or more images. The face decoder 118 takes the feature vectors as input and reconstructs the one or more images based on its learned parameters.

The face fusion method demonstrated in the present disclosure, although applied to two face image sources, can be extended to fuse more than two face images. This scalability allows for the integration of multiple face inputs, enabling the creation of fused faces from multiple sources. For example, in various embodiments, user can input multiple face images (e.g., more than two sources) via the user interface 102 and then the recorder 110 can record these multiple face images, and thus the facial fused feature may be synthesized/generated from the more than two face images.

Figure 5A:
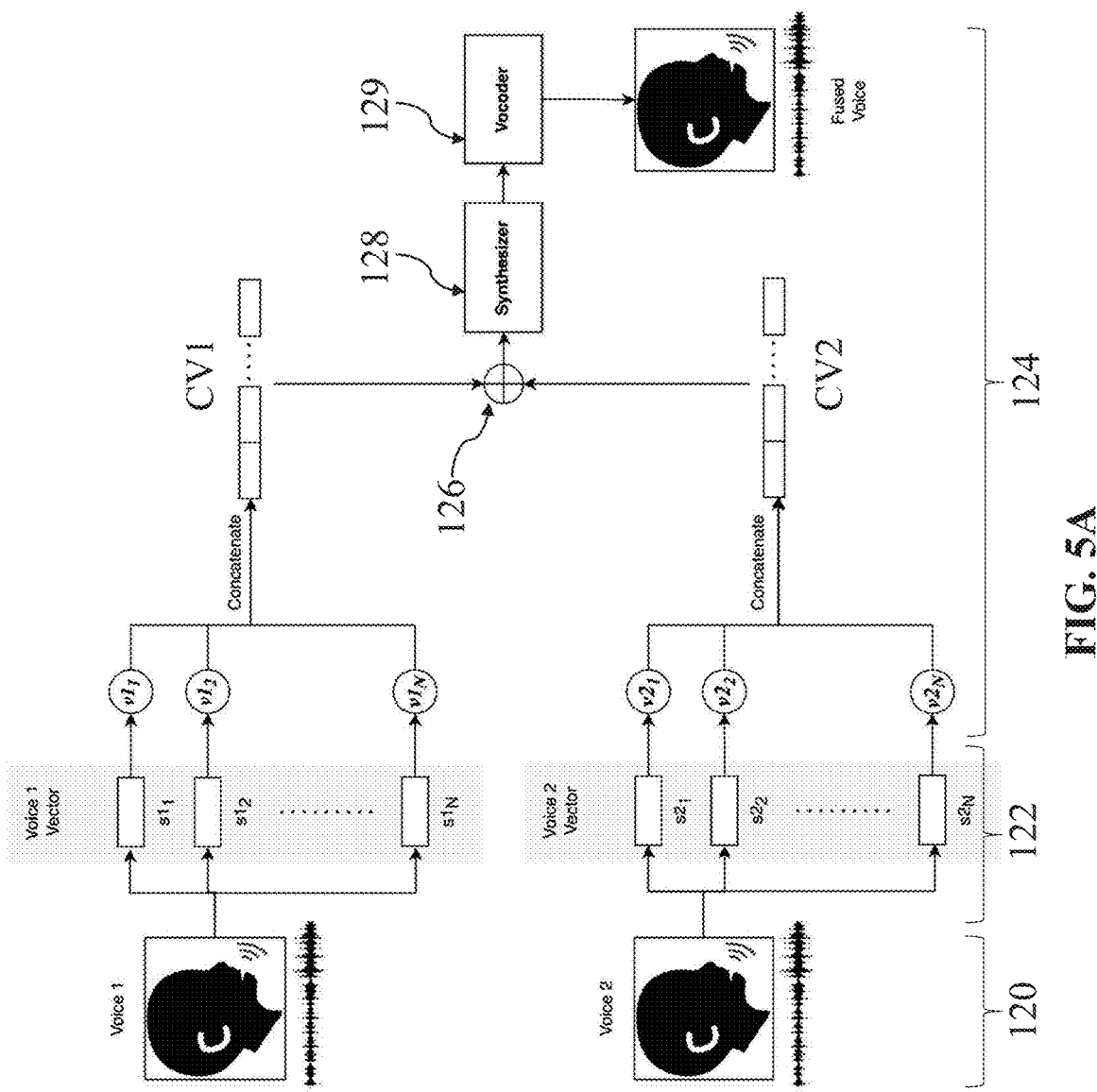
FIGS. 5A and 5B depict the schematic diagrams of the voice fusion process steps as illustrated in FIG. 4.
Figure 4:
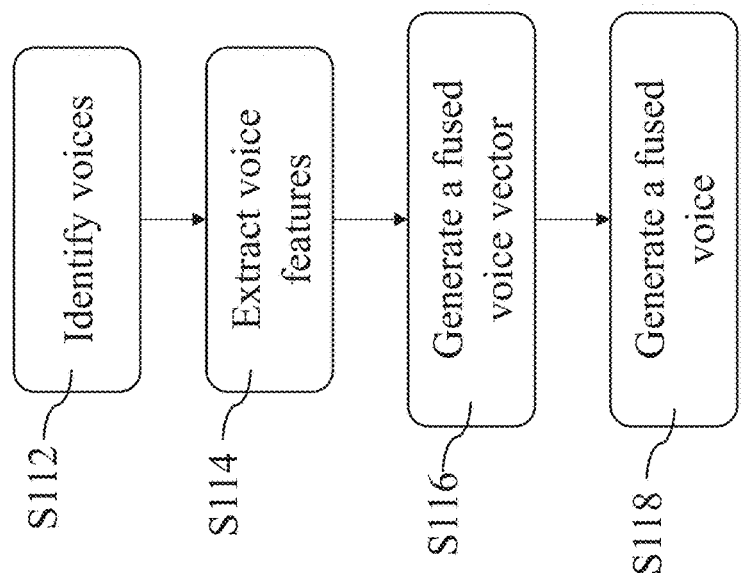
FIG. 4 depicts a schematic flowchart for voice fusion in accordance with an embodiment of the present invention.
Figure 5B:
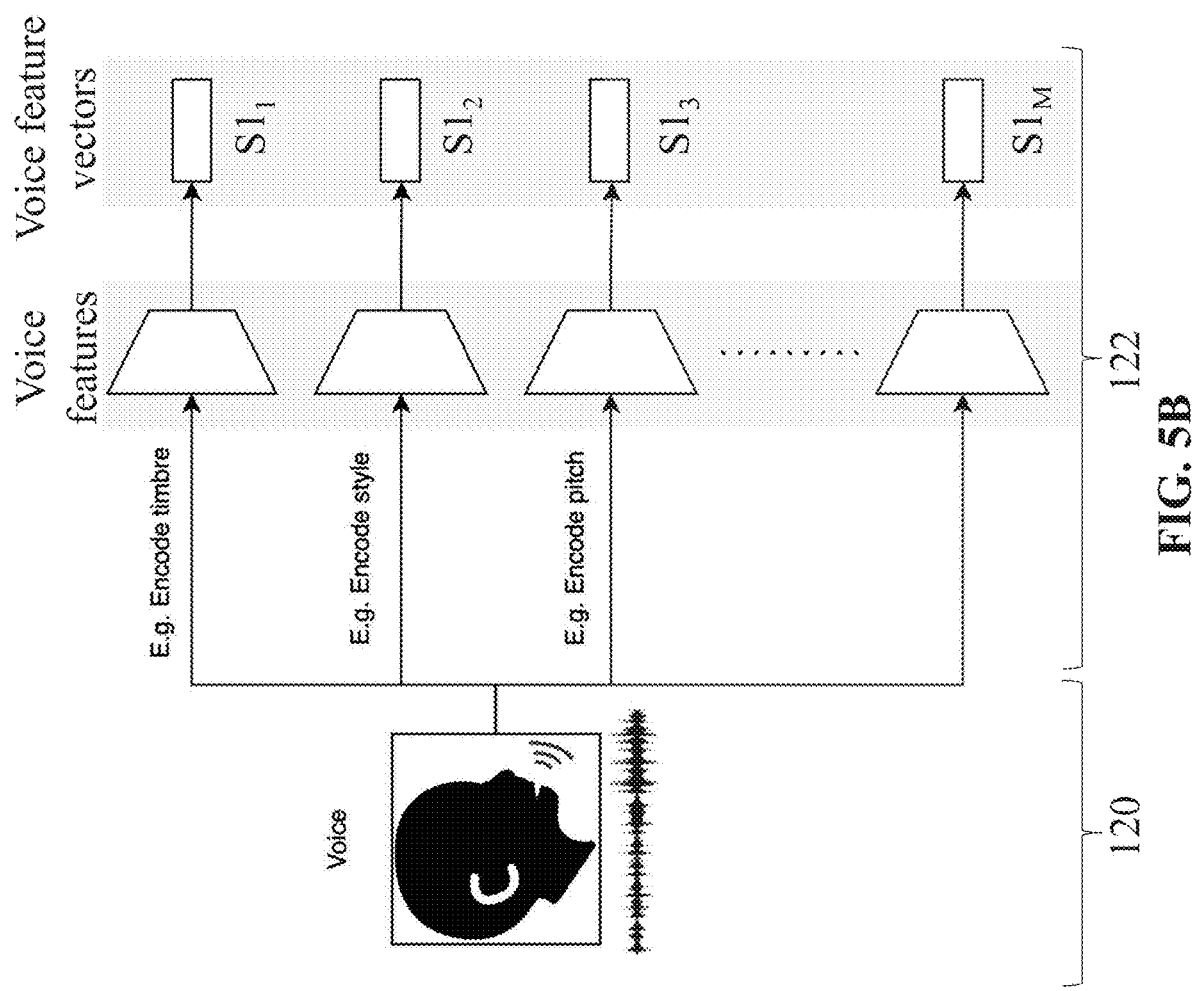

Referring to FIGS. 4, 5A, and 5B for the following description. The voice fusion includes steps S112, S114, S116, and S118.

In the step S112, the voice recorder 120 receives a first audio clip and a second audio clip from the user interface 102 and store them, in which the first audio clip and the second audio clip are two discernible differences audio clips. The voice encoder 122 accesses the voice recorder 120 to read the audio clips and identify the voices in the first and second audio clips.

The voice encoder 122 is trained to identify audio clips via the following procedures. A labeled dataset containing audio clips and their corresponding identities is prepared. A suitable voice identification model is chosen, and the model is trained using the dataset, with audio clips as inputs and identities as labels. The model's performance is evaluated, and adjustments can be made if necessary. Through this process, the voice encoder 122 learns to identify the audio clips. In various embodiments, the labeled identities include various voice features such as timbre, style (i.e., including intention, emotion), prosody (i.e., including tone, pitch, intonation, stress, rhythm).

In the step S114, the voice encoder 122 extracts voice features from the audio clips. Specifically, the voice encoder 122 extracts a plurality of first voice features, as exemplary listed above, from the first audio clip, and then encodes the extracted first voice features into N first voice feature vectors $s1_1$, $s1_2$, $s1_N$ (i.e., each first voice feature vector represents one feature of the voice from the first audio clip). The voice encoder 122 can further extract a plurality of second voice features, as exemplary listed above, from the second audio clip, and then encode the extracted second voice features into N second voice feature vectors $s2_1$, $s2_2$, $s2_N$ (i.e., each second voice feature vector represents one feature of the voice from the second audio clip). This encoding process involves representing the extracted voice features as numerical representations in the form of feature vectors. By encoding the extracted voice features into feature vectors, the voice encoder 122 transforms the qualitative voice information into quantitative representations. These quantitative representations are suitable for further processing, such as voice fusion.

In step S116, the voice fusion engine 124 synthesizes a voice fused feature vector by combining the first voice feature vectors with the second voice feature vectors. Specifically, the voice fusion engine 124 assigns weights, $v1_1$, $v1_2$, $v1_M$, to the first voice feature vectors $s1_1$, $s1_2$, $s1_N$, respectively, and weights $v2_1$, $v2_2$, $v2_M$, to the second voice feature vectors $s2_1$, $s2_2$, $s2_N$, respectively.

The first voice feature vectors with their respective weights are concatenated to form a first single vector CV1, and the second voice feature vectors with their respective weights are concatenated to form a second single vector CV2. The face fusion engine 114 also includes a combiner 126 that receives the first and second single vectors CV1 and CV2 and fuses them together to generate the voice fused feature vector.

During the fusion process, the N first voice feature vectors are paired one-to-one with the N second voice feature vectors, and each pair may have a different weight set. In various embodiments, the different pairs are permitted to have different weight sets. For example, a vector representing the voice timbre in the first audio clip, with a weight A2, is paired with another vector representing the timbre in the second audio clip, with a weight B2. Similarly, a vector representing the pitch in the first audio clip, with a weight C2, is paired with another vector representing the pitch in the second audio clip, with a weight D2. It should be noted that, in an embodiment, A2+B2=1, C2+D2=1, and A2≠C2 and B2≠D2. In one embodiment, the assigned weights are obtained from a second weight distribution. This means that the generation of the voice fused feature vector depends on the specific weight distribution used. The determination of the second weight distribution is discussed in the later description as well as the first weight distribution.

The voice fusion engine 124 further includes a synthesizer 128 and a vocoder 129. In step S118, the synthesizer 128 synthesizes and generates speech using the voice fused feature vector as input, converting it into sound. By employing sound synthesis techniques, the synthesizer 128 generates a sequence of sound segments or waveforms based on the encoded information in the voice fused feature vector, such as timbre and pitch. The vocoder 129 receives the outputs from the synthesizer 128, utilizing them to generate a fused voice based on the voice fused feature vector. Functioning as a voice decoder, the vocoder 129 decodes and synthesizes the sound signal, enabling the synthesized sounds produced by the synthesizer 128 to restore the original vocal characteristics and expressions. Through the collaboration of the synthesizer 128 and vocoder 129, the voice fused feature vector is transformed into natural and realistic voice. The voice fusion method demonstrated in the present disclosure, although applied to two audio clip image sources, can be extended to fuse more than two audio clips. This scalability allows for the integration of multiple voice inputs, enabling the creation of fused voices from multiple sources. For example, in various embodiments, user can input multiple audio clips (e.g., more than two sources) via the user interface 102 and then the recorder can record these multiple audio clips, and thus the voice fused feature may be synthesized/generated from the more than two audio clips.

Referring again to FIG. 1, the resulting fused face image and fused voice can be inputted into the avatar generator 132 to create a virtual avatar that incorporates both. In one embodiment, the generated fused face image and fused voice are firstly stored in the cache 130 and the avatar generator 132 accesses the cache 130 in response to a user's generation instruction, using the stored fused face image and fused voice to generate the virtual avatar.

Regarding determination of the first weight distribution and the second weight distribution, in the present disclosure, there are two manners to determine the weight distribution, including a manual controlling mode and an automatic setting mode.

Figure 6:
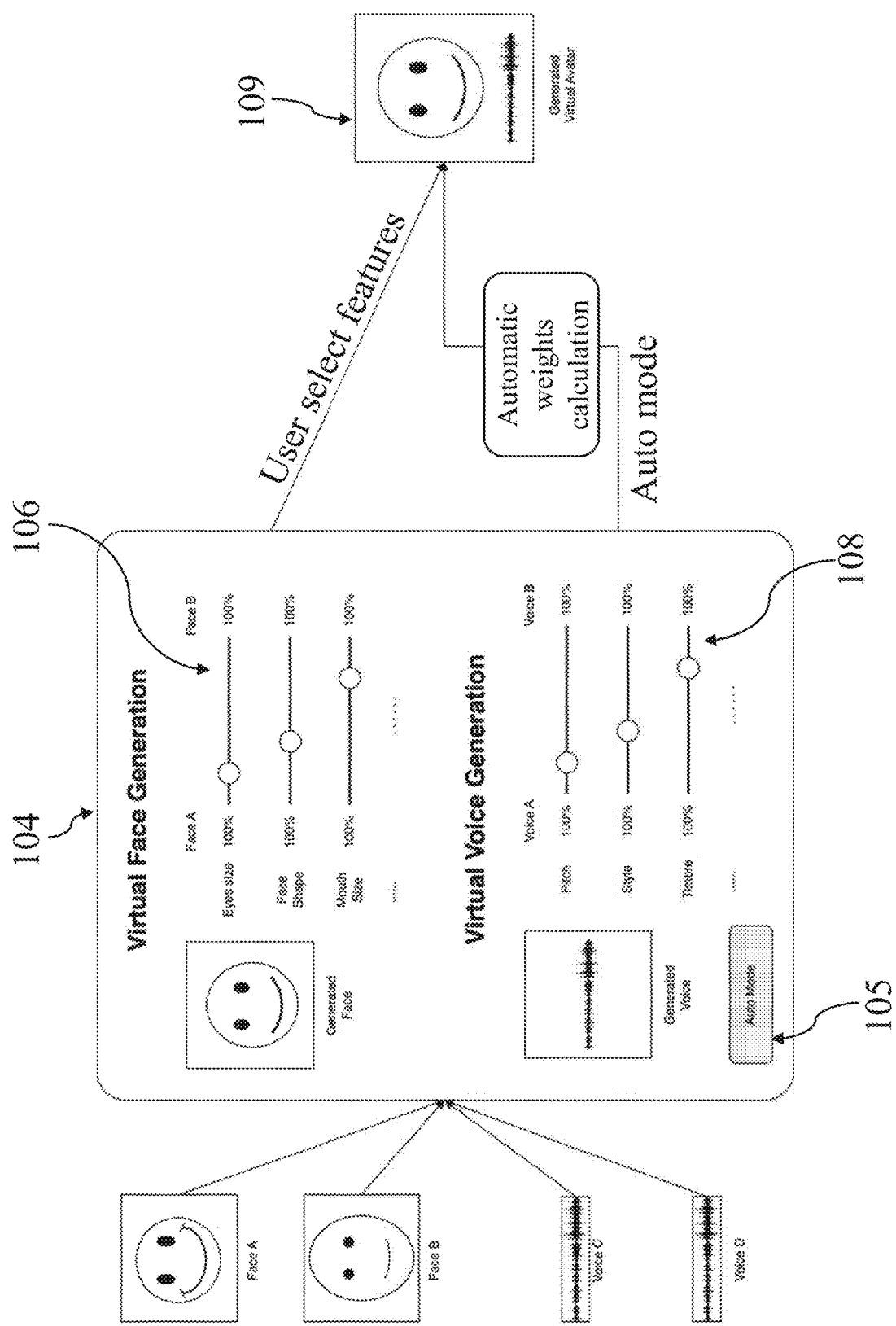
FIG. 6 depicts a schematic diagram of a virtual dashboard for a manual controlling mode in accordance with an embodiment of the present invention.

FIG. 6 depicts a schematic diagram of a virtual dashboard 104 for a manual controlling mode in accordance with an embodiment of the present invention. The user interface has a virtual dashboard 104 for providing users with a manual controlling mode. As different faces and voices (i.e., faces A and B and voices C and D as illustrated in FIG. 6) are processed as afore-described, the generation of fused face and voice depends on the first weight distribution and the second weight distribution.

The virtual dashboard 104 displays M controllable bars 106 for facial features and N controllable bars 108 for voice features. The M controllable bars 106 represent the weights to be assigned to the first facial feature vectors and the second facial feature vectors, so the first weight distribution can be determined by the user through a series of manual adjustments. Similarly, the N controllable bars 108 represent the weights for the first voice feature vectors and the second voice feature vectors, with the second weight distribution also determined by the user through a series of adjustments.

The purpose of the controllable bars 106 and 108 is to allow users to balance the target features. For example, in the case of the facial feature "eyes size", shifting the controllable bar 106 to the left indicates assigning more weight to face A and less weight to face B, with an increase in weight for face A equal to a decrease in weight for face B. In some embodiments, the user interface 102 includes an electronic display 109 dynamically showing the fused image and plays the fused voice of the virtual avatar, providing real-time feedback as the user adjusts the controllable bars 106 and 108. As such, the weighting mechanism provides a gradually level of fusion for each facial feature or voice feature.

Figure 7:
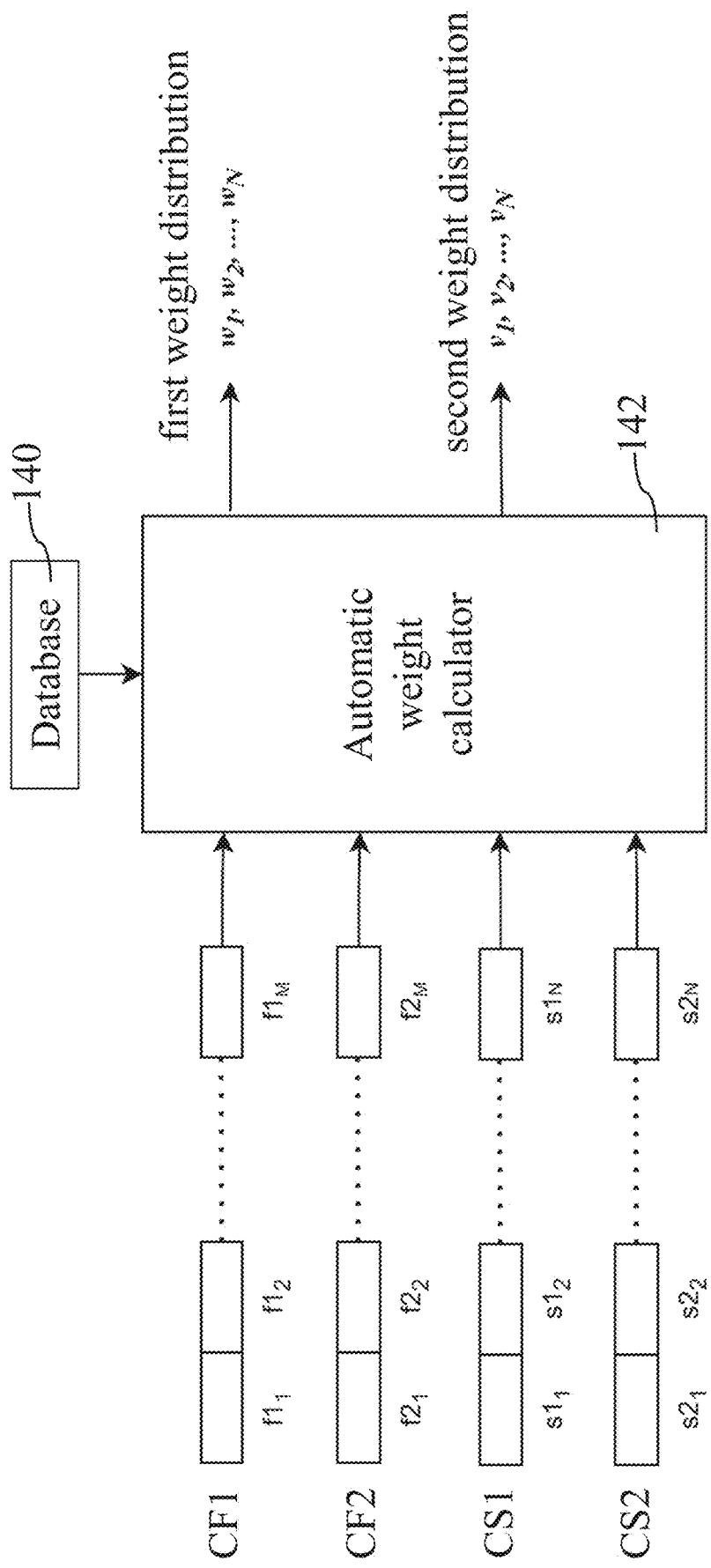
FIG. 7 depicts a schematic diagram illustrating a method for proceeding an automatic setting mode in accordance with an embodiment of the present invention.

In one embodiment, the virtual dashboard 104 shows a button 105 for an automatic setting mode, which provides users with automatic weight calculation, thereby quickly generating the virtual avatar. Referring to FIG. 7 for the following description. The illustration in FIG. 7 is at a stage assuming that the face single vectors CF1 and CF2, as well as the voice single vectors CS1 and CS2, have already been formed.

The apparatus 100 may further include a database 140 and an automatic weight calculator 142. The database 140 stores a collection of face image references and audio clip references obtained from real human features, which are then utilized by the automatic weight calculator 142. The automatic weight calculator 142 is configured to calculate the first weight distribution and the second weight distribution by matching the fused image with the fused voice based on pairs of the face image references and audio clip references. The objective of calculating these weight distributions by the automatic weight calculator 142 is to ensure a smooth balance among the face single vectors CF1 and CF2 (derived from the first and second facial images, respectively) and the voice single vectors CS1 and CS2 (derived from the first and second audio clips, respectively), such that the fusion result can well match with real human face and voice, thereby avoiding abrupt user experience.

Figure 8:
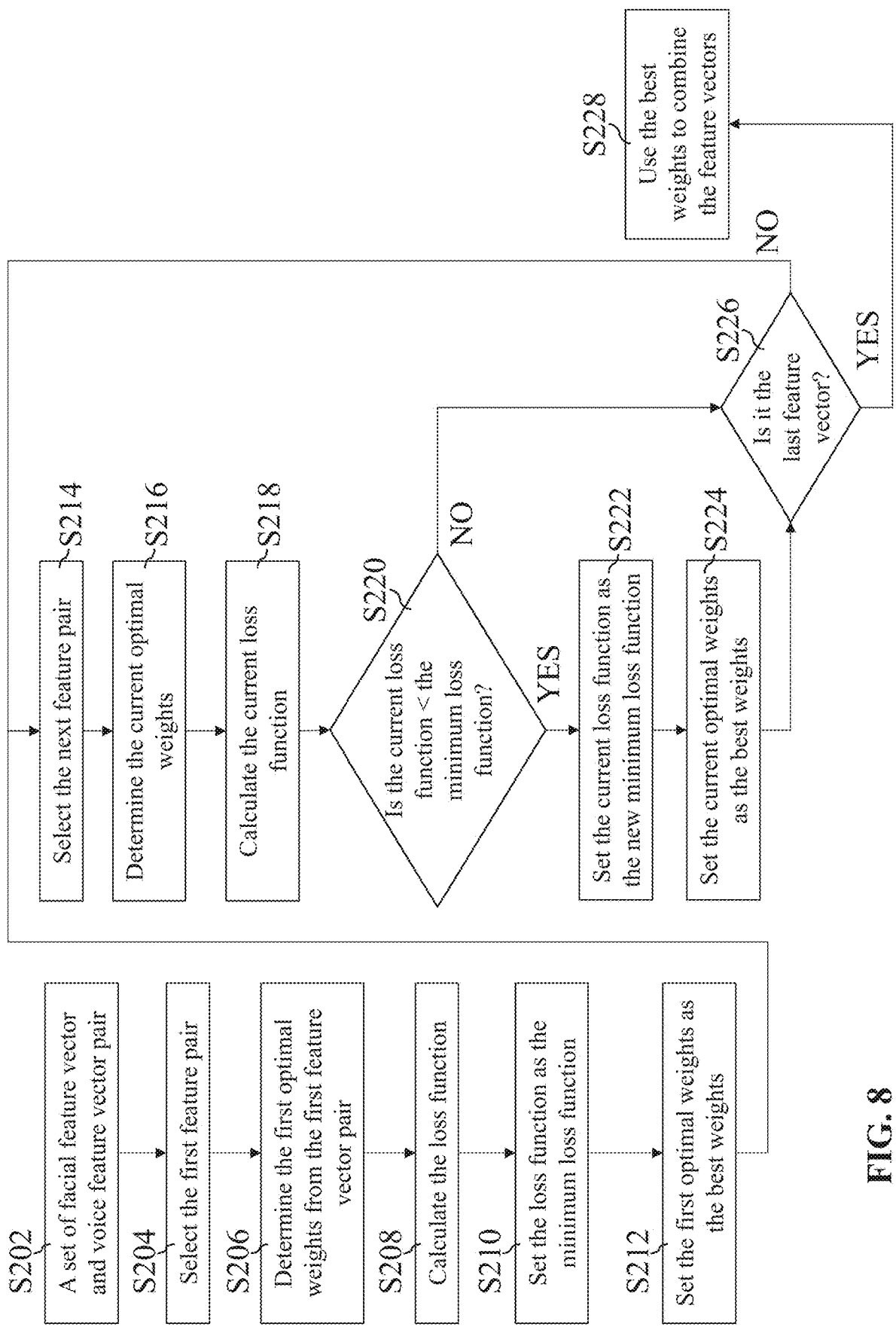
FIG. 8 depicts a flowchart diagram for automatic matching of a fused image with a fused voice in accordance with an embodiment of the present invention.

Referring to FIG. 8 for the following description. In accordance with one embodiment, an automatic matching of a fused image with a fused voice comprises the steps S202, S204, S206, S208, S210, S212, S214, S216, S216, S218, S220, S222, S224, S226, and S228. In the automatic matching, a number of real pairs of face feature vector and voice feature from the database 140 serve as references. A loss function $L_k$ and optimal weights of $w_i$ and $v_j$ can be expressed as:

$$L_k = \sum_{i=1}^{M} \|w_i f1_i + (1-w_i) f2_i - I_{f_i}^k\|_2 + \sum_{j=1}^{N} \|v_j s1_j + (1-v_j) s2_j - I_{v_i}^k\|_2;$$

$$w_i = \frac{\langle f2_i - I_{f_i}^k, f1_i - f2_i \rangle}{\|f1_i - f2_i\|_2};$$

$$v_j = \frac{\langle s2_j - I_{v_i}^k, s1_j - s2_j \rangle}{\|s1_j - s2_j\|_2};$$

where $w_i$ is the weighting for it facial feature for first image; $f1_i$ is $i_{th}$ facial feature vector for the first image; $(1-w_i)$ is the weighting for $i_{th}$ facial feature for second image; $f2_i$ is $i_{th}$ facial feature vector for the second image;

$$I_{f_i}^k$$

is $k_{th}$ sample of $i_{th}$ facial feature for the reference real face; $v_j$ is the weighting for $j_{th}$ voice feature for first image; $s1_j$ is $j_{th}$ voice feature vector for the first image; $(1-v_j)$ is the weighting for $j_{th}$ voice feature for second image; $s2_j$ is $j_{th}$ voice feature vector for the second image; and $$I_{v_i}^k$$

is $k_{th}$ sample of $j_{th}$ voice feature for the reference real voice. These expressions aim to find the weights for face fusion and voice fusion optimized for a given pair of feature vectors $$I_{f_i}^k \text{ and } I_{v_i}^k,$$

so the target solution is to determine the k, w and v that give minimum $L_k$.

In the step S202, a target set of facial feature vectors and voice feature vectors from input face images and audio clips are prepared, in which their weights are pending. In the step S204, a pair of features for the reference real face and the reference real voice is selected. In the step 206, those selected parameters are substituted into the optimal weights of $w_i$ and $v_j$, so as to determine the first optimal weights, which serve a pair of intermediate weights. In the step S208, those selected parameters with the optimal weights of $w_i$ and $v_j$ are substituted into the loss function $L_k$ for calculation of the loss function. In the step S210, after the calculation, the loss function is set as the intermediate minimum loss function. In the step S212, the intermediate weights using for the calculation at the step S208 are set as the intermediate best weights. This completes the first calculation, and further calculations will be performed to determine the best weights by calculating the loss function for different sets of facial feature vectors, voice feature vectors, and reference real faces and voices.

In the step S214, the next pair of features for the reference real face and the reference real voice is selected, which is different than those in the step S204. In the step S216, those selected parameters in the step S214 are substituted into the optimal weights of $w_i$ and $v_j$, so as to determine the current optimal weights, which serve as the intermediate weights as well. In the step S218, those selected parameters with the current optimal weights of $w_i$ and $v_j$ obtained in the step S216 are substituted into the loss function $L_k$ for calculation of the current loss function.

In the step S220, it is to determine whether the current loss function obtained from the step S218 is less than the intermediate minimum loss function obtained from the step S208. If the determination is YES, the process proceeds to the step S222, and the current loss function is set as the new intermediate minimum loss function. Then in the step S224, the current optimal weights are set as the best intermediate weights. The term "intermediate" is used here to indicate that the parameters are updatable or replaceable, as the continuously calculated loss function is compared with the previous one, and the loss function and optimal weights may be updated during the process.

After the setting at the step S224, it continues with the step S226. Also, at the step S220, if the determination is NO, there is no updating or replacing for the loss function as well as the optimal weights, and the process then proceeds to the step S226. In the step S226, it is to determine whether the selected pair of the feature vectors applied to the step S214 is the last pair of the feature vectors. The step S226 is made as setting for including all the feature vectors in the calculation of the loss function as much as possible, there by aiming to identify the minimum loss function among them. If the determination is NO, the process proceeds to the step S214 to select the other feature vectors and continue calculating the loss function and finding out if any the minimum loss function exists. If the determination is YES, the next is the step S228. In the step S228, determined weights, resulting in the minimum loss function, are outputted for determining the first weight distribution and the second weight distribution to the face fusion engine 114 and the voice fusion engine 124, completing the automatic setting mode.

While the present disclosure demonstrates the use of two inputs for the face fusion and voice fusion, the logic of the approach adopted allows for expansion to incorporate more than two input sources. For example, in the method illustrated in FIG. 6, with more than two input sources, it can be adapted to adjust the weight of each input source with the total sum of weights for the inputs remaining at 100%. In various embodiments, in the method illustrated in FIG. 7, facial feature vectors and voice feature vectors are extracted from more than two input sources and brought into the automatic weight calculation for the matching.

The functional units and modules of the apparatuses, systems, and/or methods in accordance with the embodiments disclosed herein may be implemented using computer processors or electronic circuitries including but not limited to application specific integrated circuits (ASIC), field programmable gate arrays (FPGA), microcontrollers, and other programmable logic teaching aids configured or programmed according to the teachings of the present disclosure. Computer instructions or software codes running in the computing teaching aids, computer processors, or programmable logic teaching aids can readily be prepared by practitioners skilled in the software or electronic art based on the teachings of the present disclosure.

The embodiments may include computer storage media, transient and non-transient memory teaching aids having computer instructions or software codes stored therein, which can be used to program or configure the computing teaching aids, computer processors, or electronic circuitries to perform any of the processes of the present invention. The storage media, transient and non-transient memory teaching aids can include, but are not limited to, floppy disks, optical discs, Blu-ray Disc, DVD, CD-ROMs, and magneto-optical disks, ROMs, RAMs, flash memory teaching aids, or any type of media or teaching aids suitable for storing instructions, codes, and/or data.

Each of the functional units and modules in accordance with various embodiments also may be implemented in distributed computing environments and/or Cloud computing environments, wherein the whole or portions of machine instructions are executed in distributed fashion by one or more processing teaching aids interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. An apparatus for virtual avatar generation, comprising:
a face recorder configured to receive and store a first facial image and a second facial image;
a face encoder configured to:
identify faces of the first facial image and the second facial image;
extract a plurality of first facial features from the first facial image and then encode them into M first facial feature vectors; and
extract a plurality of second facial features from the second facial image and then encode them into M second facial feature vectors;
a face fusion engine configured to synthesize a facial fused feature vector from the first facial feature vectors in combination with the second facial feature vectors, thereby generating a fused image from the facial fused feature vector;
a voice recorder configured to receive and store a first audio clip and a second audio clip;
a voice encoder configured to:
identify voices of the first audio clip and the second audio clip;
extract a plurality of first voice features from the first audio clip and then encode them into N first voice feature vectors; and
extract a plurality of second voice features from the second audio clip and then encode them into N second voice feature vectors;
a voice fusion engine configured to synthesize a voice fused feature vector from the first voice feature vectors in combination with the second voice feature vectors, thereby generating a fused voice from the voice fused feature vector, wherein the facial fused feature vector is generated from the first facial feature vectors and the second facial feature vectors according to a first weight distribution, and the voice fused feature vector is generated from the first voice feature vectors and the second voice feature vectors according to a second weight distribution;
wherein the facial fused feature vector is generated from the first facial feature vectors and the second facial feature vectors according to a first weight distribution, and the voice fused feature vector is generated from the first voice feature vectors and the second voice feature vectors according to a second weight distribution;
a database storing a plurality of face image references and audio clip references; and
an automatic weight calculator configured to calculate the first weight distribution and the second weight distribution by matching the fused image with the fused voice based on pairs of the face image references and audio clip references, wherein the automatic weight calculator is further configured to:
determine a pair of intermediate weights for a set of the first facial feature vectors, the second facial feature vectors, the first voice feature vectors, the second voice feature vectors by using a pair of the face image references and the audio clip references;
calculate a loss function using the set of the first facial feature vectors, the second facial feature vectors, the first voice feature vectors, the second voice feature vectors, the intermediate weights, and the pair of the face image references and the audio clip references;

calculate the loss function for all sets of the first facial feature vectors, the second facial feature vectors, the first voice feature vectors, the second voice feature vectors, the face image references, and the audio clip references, aiming to identify the minimum loss function among them; and output determined weights, which result in the minimum loss function, for determining the first weight distribution and the second weight distribution to the face fusion engine and the voice fusion engine.

2. The apparatus of claim 1, further comprising a user interface that has a virtual dashboard with:

M controllable bars representing facial weights to be assigned to the first facial feature vectors and the second facial feature vectors, wherein the first weight distribution is produced by a series of the facial weights; and N controllable bars representing voice weights to be assigned to the first voice feature vectors and the second voice feature vectors, wherein the second weight distribution is produced by a series of the voice weights.

3. The apparatus of claim 2, wherein the M first facial feature vectors are paired one-to-one with the M second facial feature vectors, and the N first voice feature vectors are paired one-to-one with the N second voice feature vectors.

4. The apparatus of claim 3, wherein a first vector of the first facial feature vectors is paired with a first vector of the second facial feature vectors by a first facial weight set, wherein a second vector of the first facial feature vectors is paired with a second vector of the second facial feature vectors by a second facial weight set permitted to be different than the first facial weight set.

5. The apparatus of claim 1, further comprising a user interface that has an electronic display configured to dynamically show the fused image and play the fused voice.

6. The apparatus of claim 1, further comprising an avatar generator configured to generate a virtual avatar incorporating the fused image and the fused voice.

7. The apparatus of claim 6, further comprising a cache configured to store the fused image and the fused voice to be accessed by the avatar generator.

8. A method for virtual avatar generation, comprising:
receiving and storing a first facial image and a second facial image by a face recorder;
identifying faces of the first facial image and the second facial image by a face encoder;
extracting a plurality of first facial features from the first facial image and then encode them into M first facial feature vectors by the face encoder;
extracting a plurality of second facial features from the second facial image and then encode them into M second facial feature vectors by the face encoder;
synthesizing a facial fused feature vector from the first facial feature vectors in combination with the second facial feature vectors by a face fusion engine, thereby generating a fused image from the facial fused feature vector;
receiving and storing a first audio clip and a second audio clip by a voice recorder;
identifying voices of the first audio clip and the second audio clip by a voice encoder;
extracting a plurality of first voice features from the first audio clip and then encode them into N first voice feature vectors by the voice encoder;
extracting a plurality of second voice features from the second audio clip and then encode them into N second voice feature vectors by the voice encoder;
synthesizing a voice fused feature vector from the first voice feature vectors in combination with the second voice feature vectors by a voice fusion engine, thereby generating a fused voice from the voice fused feature vector, wherein the facial fused feature vector is generated from the first facial feature vectors and the second facial feature vectors according to a first weight distribution, and the voice fused feature vector is generated from the first voice feature vectors and the second voice feature vectors according to a second weight distribution;
storing a plurality of face image references and audio clip references in a database;
calculating, by an automatic weight calculator, the first weight distribution and the second weight distribution by matching the fused image with the fused voice based on pairs of the face image references and audio clip references;
determining, by the automatic weight calculator, a pair of intermediate weights for a set of the first facial feature vectors, the second facial feature vectors, the first voice feature vectors, the second voice feature vectors by using a pair of the face image references and the audio clip references;
calculating, by the automatic weight calculator, a loss function value using the set of the first facial feature vectors, the second facial feature vectors, the first voice feature vectors, the second voice feature vectors, the intermediate weights, and the pair of the face image references and the audio clip references;
calculating, by the automatic weight calculator, the loss function for all sets of the first facial feature vectors, the second facial feature vectors, the first voice feature vectors, the second voice feature vectors, the face image references, and the audio clip references, aiming to identify the minimum loss function among them; and
outputting, by the automatic weight calculator, determined weights, which result in the minimum loss function, for determining the first weight distribution and the second weight distribution to the face fusion engine and the voice fusion engine.

9. The method of claim 8, further comprising:
showing M controllable bars, by a virtual dashboard, representing facial weights to be assigned to the first facial feature vectors and the second facial feature vectors, wherein the first weight distribution is produced by a series of the facial weights; and
showing N controllable bars, by the virtual dashboard, representing voice weights to be assigned to the first voice feature vectors and the second voice feature vectors, wherein the second weight distribution is produced by a series of the voice weights.

10. The method of claim 9, wherein the M first facial feature vectors are paired one-to-one with the M second facial feature vectors, and the N first voice feature vectors are paired one-to-one with the N second voice feature vectors.

11. The method of claim 10, wherein a first vector of the first facial feature vectors is paired with a first vector of the second facial feature vectors by a first facial weight set, wherein a second vector of the first facial feature vectors is paired with a second vector of the second facial feature vectors by a second facial weight set permitted to be different than the first facial weight set.

12. The method of claim 8, further comprising dynamically showing the fused image and play the fused voice by an electronic display.

13. The method of claim 8, further comprising generating a virtual avatar incorporating the fused image and the fused voice by an avatar generator.

14. The method of claim 13, further comprising storing the fused image and the fused voice in a cache for accessing by the avatar generator.

\* \* \* \* \*